Patented Apr. 22, 1941

2,239,495

UNITED STATES PATENT OFFICE 2,239,495

TERPENE-CYANOACYL COMPOUNDS AND METHODS OF PRODUCING SAME

Joseph N. Borglin, Wilmington, Del., assignor to Hercules Powder Company, Wilmington, Del., a corporation of Delaware No Drawing. Application December 27, 1939, Serial No. 311,164

16 Claims. (Cl. 260—454)

This invention relates to a new series of terpene compounds and more particularly to a new series of terpene compounds having the type formula ROOCR'XCN in which R is a radical consisting of an ether of a monohydric alcohol and a terpene compound, in which R' is an aliphatic or aromatic radical, and in which X is a member of the group consisting of sulfur, selenium, and tellurium. The invention also relates to a method for the production of these compounds.

By the method in accordance with this invention, I react a compound which is the ether of a terpene compound and a monohydric alcohol with a halogenated organic acid and then with a metal thiocyanate, a metal selenocyanate, or a metal tellurocyanate, which is reacted upon under the conditions employed.

The terpene ether upon which I react with the halogenated acid may be an ether prepared by etherification of a terpene alcohol with a monohydric alcohol or it may be an ether prepared by an addition reaction of a monohydric alcohol with an unsaturated terpene compound. These ethers may be prepared, for example, as described in U. S. Patent 2,136,011, which issued November 8, 1938, to I. W. Humphrey, or in U. S. Patent 2,182,826 which issued December 12, 1939, to D. H. Sheffield. For example, the terpene ether may be an ether of methyl, ethyl, propyl, isopropyl, butyl, isobutyl, amyl, hexadecyl, octadecyl, stearyl, lauryl, oleyl, myristyl, abietyl, benzyl, tolyl, etc. alcohol, or of ethylene chlorohydrin, propylene chlorohydrin, tetrahydrofurfuryl alcohol; monomethyl or monoethyl or monobutyl, etc. ether of ethylene glycol phenol, cresol, etc. and any one of such terpenes as, for example, pinene, dipentene, terpinene, terpinolene, camphene, menthene, carene, sabinene, etc., terpineol, borneol, isoborneol, fenchyl alcohol, etc. or crude terpene cuts such as wood or gum turpentine, pine oil, etc.

Thus, for example, utilizing the ethers made from the reaction of pinene with methyl alcohol or with ethyl alcohol, thiocyanoacetates, thiocyanopropionates, etc. esters of such ethers will be produced. Specifically, the product made from these ethers of pinene will be predominantly the thiocyanoacyl esters of terpinyl methyl ether or of terpinyl ethyl ether, as the case may be, with other pinene derivatives in admixture. Similarly, the corresponding thiocyanoacyl esters (or their seleno- or telluro- counterparts) are obtained using ethers prepared by reacting any of the monohydric alcohols named with any of the terpenes named. Because of their ready availability, the ethers of such terpenes as pinene, dipentene, terpinolene, and terpinene with lower aliphatic alcohols such as methyl, ethyl, etc. alcohols are preferred. However, the ether of a terpene which I may utilize is limited only in that it must be unsaturated, be capable of rearrangement to an unsaturated compound, or carry a hydroxyl group.

The halogenated organic acid which I use may be such as, for example, monochloracetic acid, dichloracetic acid, trichloroacetic acid, alpha-chloropropionic acid, beta-chloropropionic acid, alpha-chlorobutyric acid, beta-chlorobutyric acid, gamma-chlorobutyric acid, a dichloropropionic acid, a dichlorobutyric acid, a chlorovaleric acid, a chlorocaproic acid, chlorobenzoic acid, chloromalonic acid, chlorophthalic acid, chlorolauric acid, chloromyristic acid, chloropalmitic acid, chloroleic acid, chlororicinoleic acid, chlorostearic acid, chlorobehenic acid, etc., and the corresponding fluorine, bromine, and iodine substituted acids. Mixtures of the acids may be used if desired.

The metal thiocyanate which I use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, ammonium thiocyanate, calcium thiocyanate, etc. When it is desired to make the terpene selenocyanate, the metal selenocyanate I may use, may be, for example, sodium selenocyanate, potassium selenocyanate, lithium selenocyanate, ammonium selenocyanate, calcium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The terpene ether will first be reacted with a halogenated acid and the resulting halogen acid ester of the terpene isolated from the by-products of the reaction. Preferably, acidic material is eliminated as by washing with water. The second stage of the reaction is the treatment of this halogen substituted acid ester of the terpene ether with the metallic thiocyanate, selenocyanate, or tellurocyanate, as the case may be, followed by recovery of the product. I may carry out each of these steps in the presence of a suitable solvent which is substantially inert, such as, for example, methanol, ethanol, isopropanol, propanol, acetone, ethyl acetate. In fact, I prefer to use an inert solvent in the second stage. Each step may be carried out at any temperature within the range of about 0° C. to about 250° C., and preferably within the range of about 30° C. to about 180° C.

The halogen substituted acylates of the first stage reaction are light in color if the reaction is carried out in the absence of oxygen, for example, under a blanket of $CO_2$. Substantially water white esters may be obtained by vacuum distillation. The color of the thiocyanoacylate products follows the color of the first stage ester from which they are prepared. Where very light colored products are desired and where it is desired to insure products of no odor or minimum odor, the first stage reaction may be conducted, if desired, in a non-oxidizing atmosphere, or the first stage product may be vacuum distilled, or both these measures may be taken.

In the reaction according to this invention, the halogenated acid may react at one or more reactive positions of the ether utilized according to the number of reactive positions available and the conditions of the reaction. It may react by addition at a double bond, or at a position of latent unsaturation produced by bridge opening in a complex polycyclic terpene compound, or at a hydroxyl group if there be one. Thus, in some cases, more than one thiocyanoacyl unit may be introduced.

The method in accordance with this invention will be further illustrated by the examples which follow. In the examples all parts and percentages will be by weight unless otherwise specified.

Example 1

A mixture of 24.4 parts of n-amyl ethers of beta-pinene and 18.9 parts of chloroacetic acid was heated under reflux for 50 hours in an oil bath, the temperature of which was kept between 170–180° C. A carbon dioxide atmosphere was maintained above the reaction mixture. The mixture was then dissolved in commercial hexane and the solution obtained was washed with water until the wash water was neutral to methyl red indicator. The solvent was distilled off at reduced pressure and a yield of 27.2 parts of chloroacetic esters was obtained.

25 parts of this product were dissolved in 80 parts of ethyl alcohol (95% by volume), 15 parts of potassium thiocyanate added and the mixture was refluxed for one hour. About 100 parts of water and 80 parts of benzene were added and the mixture shaken. The mixture was then allowed to separate into two layers which were separated. The benzene layer was washed three times with water and the benzene removed by distillation at reduced pressure. There was obtained a yield of 27.8 parts of product, having a sulfur content of 6.2%, containing the thiocyanoacetate esters of n-amyl ethers of beta-pinene.

Example 2

In this example, the methyl ethers prepared by the additive reaction of methyl alcohol with a terpene cut known as "para-thinner" and which consists essentially of a mixture of dipentene, terpinene, and terpinolene diluted to some extent with such unreactive saturated hydrocarbons as para-menthane. A mixture of 24.9 parts of the said methyl ethers and 32.6 parts of alpha-chloropropionic acid was heated for 8 hours in an oil bath, the temperature of which rose gradually from 110–125° C. and subsequently for 7 hours at bath temperatures of 125–140° C. The resulting mixture was dissolved in 80 parts of benzene and the solution obtained was washed with water. The benzene was removed by distillation at reduced pressure and a product with a chlorine content of 6.5% was obtained.

11.2 parts of the chloropropionates thus obtained were dissolved in 50 parts of ethyl alcohol (95% by volume), 10 parts of sodium thiocyanate were added and the resulting mixture was refluxed for one hour. The mixture was then shaken with 80 parts of benzene and 100 parts of water. Two layers were then allowed to form and separate. The benzene solution was washed with water after which solvent was distilled off at reduced pressure. The product thus obtained consisted of a mixture of thiocyanopropionates of methyl ethers of the several terpenes hereinabove mentioned diluted with compounds which did not esterify. It had a sulfur content of 3.7%.

Example 3

A mixture of 16.8 parts of terpinolene methyl ethers and 25.1 parts of alpha-bromobutyric acid was heated under a blanket of carbon dioxide for about 24 hours in an oil bath, the temperature of which rose gradually from 114–154° C. The reaction mixture was cooled and dissolved in 80 parts of benzene. The resulting solution was washed with water after which the benzene was removed by distillation at reduced pressure. In this manner 23.7 parts of alpha-bromobutyrates of terpinolene methyl ethers containing 23.2% bromine were obtained.

22 parts of this product were dissolved in 40 parts of ethyl alcohol (95% by volume), 18 parts by weight of sodium thiocyanate was added, and the resulting mixture was refluxed for one hour. 80 parts of benzene and 100 parts of water were then shaken with the reaction mixture, and the two layers which formed upon standing were separated. The benzene solution was washed with water after which the benzene was removed by distillation at reduced pressure. The product resulting had a sulfur content of 8.6% and consisted essentially of alpha-thiocyanobutyrate esters of terpinolene methyl ethers.

The products of the examples containing unesterified terpene compounds and petroleum hydrocarbons in varying proportion. A certain portion of the original reactant is usually not esterified and, in addition, there may be some conversion of esters to terpene hydrocarbons in the second stage. The unesterified terpene compounds and petroleum hydrocarbons may be removed by vacuum distillation or vacuum steam distillation if desired. However, such removal is in general of no advantage since the products of this invention are conveniently utilized in diluted form for most purposes and since the diluents mentioned are in most cases colorless and of pleasant or slight odor. Similarly, complete removal of petroleum ether or other inert solvent from the product is usually unnecessary. However, I prefer to remove excess metal thiocyanate, selenocyanate, or tellurocyanate, and any other water soluble material from the products, for example, by thorough washing of a petroleum ether solution with water.

The compounds according to this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. The compounds are also useful as flotation agents in the concentration of minerals. They may also be used as intermediates for the preparation of other compounds, such as, for example, wetting agents by treatment with an oxidation agent such as nitric acids. Many of the compounds possess wetting power without modification.

The term "aromatic" as used herein includes any radical containing a benzene linkage in its structure. The term "pinene" as used herein includes both the alpha and beta forms of pinene.

This application is a continuation-in-part of my previous application, Serial No. 198,687, filed March 29, 1938, entitled "Terpene-cyanoacyl compounds and methods of producing same" now Patent No. 2,217,611.

It will be understood that the details and examples hereinbefore set forth are illustrative only, and that the invention as broadly described and claimed is in no way limited thereby.

What I claim and desire to protect by Letters Patent is:

1. A terpene compound having the type formula ROOCR'XCN in which R is a radical consisting of an ether of a monohydric alcohol and a terpene compound, in which R' is a radical selected from the group consisting of aliphatic radicals and aromatic radicals, in which X is a member of the group consisting of sulfur, selenium, and tellurium and in which the substituted acyloxy group is attached to a carbon atom in the terpenic portion of the ether.

2. A terpene compound having the type formula ROOCR'SCN in which R is a radical consisting of an ether of a monohydric alcohol and a terpene compound, in which R' is a radical selected from the group consisting of aliphatic radicals and aromatic radicals and in which the substituted acyloxy group is attached to a carbon atom in the terpenic portion of the ether.

3. A terpene compound having the type formula ROOCR'TeCN in which R is a radical consisting of an ether of a monohydric alcohol and a terpene compound, in which R' is a radical selected from the group consisting of aliphatic radicals and aromatic radicals and in which the substituted acyloxy group is attached to a carbon atom in the terpenic portion of the ether.

4. A terpene compound having the type formula ROOCR'SeCN in which R is a radical consisting of an ether of a monohydric alcohol and a terpene compound, in which R' is a radical selected from the group consisting of aliphatic radicals and aromatic radicals and in which the substituted acyloxy group is attached to a carbon atom in the terpenic portion of the ether.

5. A terpene compound having the type formula ROOCR'SCN in which R is a radical consisting of an ether of a monohydric alcohol and a terpene compound, in which R' is an aliphatic radical and in which the substituted acyloxy group is attached to a carbon atom in the terpenic portion of the ether.

6. A thiocyanoacetate of an ether of a terpene compound and a monohydric alcohol in which the substituted acyloxy group is attached to a carbon atom in the terpenic portion of the ether.

7. A thiocyanopropionate of an ether of a terpene compound and a monohydric alcohol in which the substituted acyloxy group is attached to a carbon atom in the terpenic portion of the ether.

8. A thiocyanoacylate of an ether formed by additive reaction of pinene and a monohydric alcohol in which the substituted acyloxy group is attached to a carbon atom in the terpenic portion of the ether.

9. A thiocyanoacetate of an ether formed by an additive reaction of pinene and methyl alcohol in which the substituted acyloxy group is attached to a carbon atom in the terpenic portion of the ether.

10. A thiocyanoacetate of an ether formed by an additive reaction of dipentene and methyl alcohol in which the substituted acyloxy group is attached to a carbon atom in the terpenic portion of the ether.

11. A thiocyanopropionate of an ether formed by additive reaction of pinene and methyl alcohol in which the substituted acyloxy group is attached to a carbon atom in the terpenic portion of the ether.

12. A method for the production of the terpene compound described in claim 1, which consists of reacting an ether of a terpene compound and a monohydric alcohol with a halogenated organic carboxylic acid and then with a compound selected from the group of metal thiocyanates, metal selenocyanates, and metal tellurocyanates, which is partially soluble in the reaction mixture.

13. A method for the production of the terpene compound described in claim 1, which consists of reacting an ether of a terpene compound and a monohydric alcohol with a halogenated organic carboxylic acid and then with a metal thiocyanate which is at least partially soluble in the reaction mixture.

14. A method for the production of the terpene compound described in claim 1, which consists of reacting an ether of a terpene compound and a monohydric alcohol with a halogenated lower fatty acid and then with an alkali metal thiocyanate.

15. A method for the production of the terpene compound described in claim 1, which consists of reacting an ether of a terpene compound and a monohydric alcohol with a brominated aliphatic carboxylic acid and then with an alkali metal thiocyanate.

16. A method for the production of the terpene compound described in claim 1, which consists of reacting an ether of a terpene compound and a monohydric alcohol with a chlorinated aliphatic organic carboxylic acid, and then with an alkali metal thiocyanate.

JOSEPH N. BORGLIN.